Dec. 31, 1940.　　A. J. MEYER ET AL　　2,226,940
CONNECTING ROD STRUCTURE
Filed Oct. 6, 1938　　2 Sheets-Sheet 2
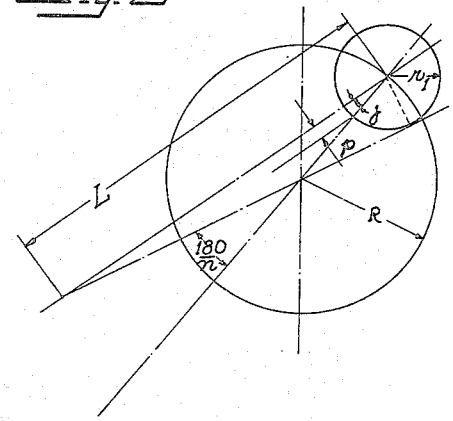
Fig. 8.
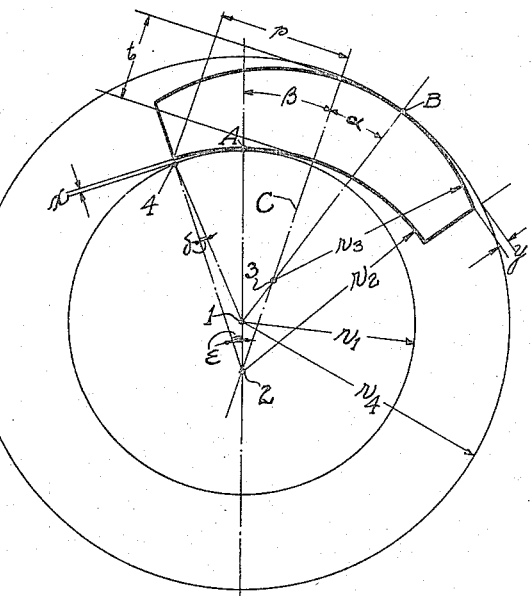
Fig. 9.
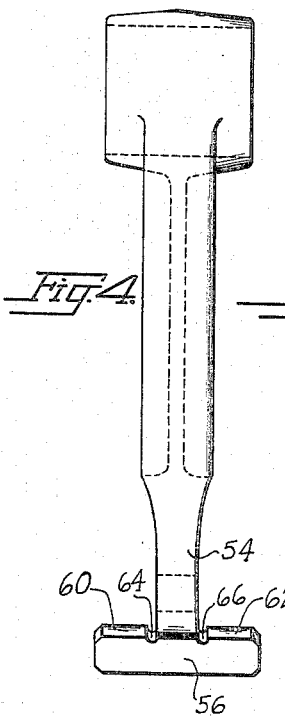
Fig. 4.　Fig. 5.
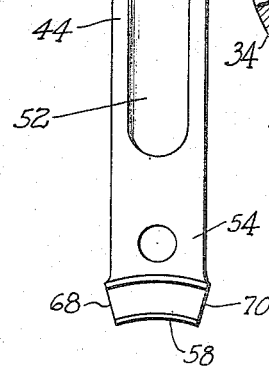
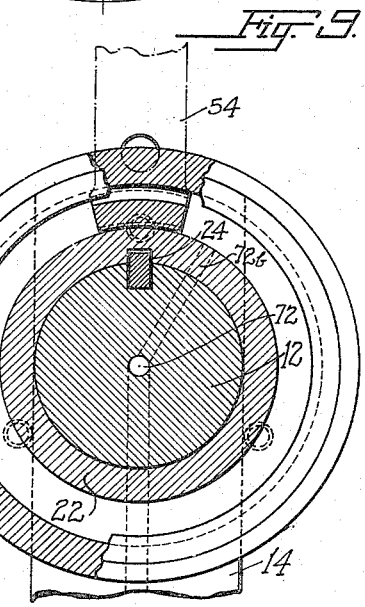
Fig. 6.
INVENTORS
André J. Meyer
Ross C. Taylor
BY their ATTORNEY.

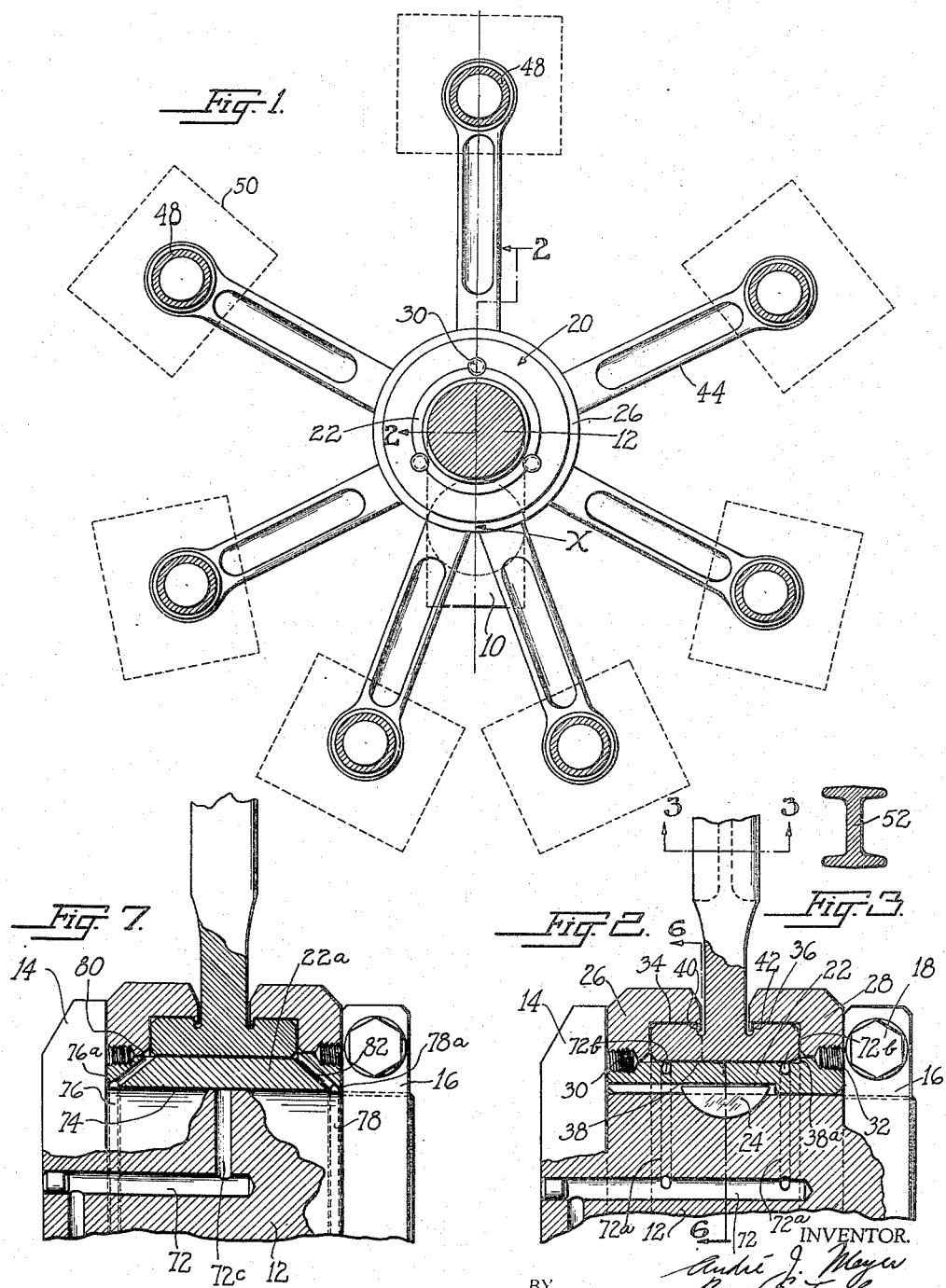

Patented Dec. 31, 1940

2,226,940

UNITED STATES PATENT OFFICE 2,226,940

CONNECTING ROD STRUCTURE

André J. Meyer and Ross E. Taylor, Lexington, Ky., assignors to Mawen Motor Corporation, New York, N. Y., a corporation of Delaware Application October 6, 1938, Serial No. 233,543

24 Claims. (Cl. 74—580)

The present invention relates to connecting rod structures and has particular reference to connecting rod structures for connecting a plurality of pistons to a common crank pin.

It is highly desirable to provide like reciprocatory motion to the several pistons working on a common crank pin, particlarly in the case of internal combustion engines, which motion is, however, not imparted thereto by the usual connecting rod arrangement for radial engines employing a master rod directly connected to the crank pin, with the remaining rods of the group connected to the master rod.

In order to improve upon the master rod type of construction, various other expedients have been resorted to which result in imparting like reciprocatory motion to the several pistons connected by the rod structure. Such expedients have been of two general types; in one type, mechanism such as gearing, linkage or the like is employed to impose orbital movement parallel to itself on a crank pin spool or thimble journaled on the crank pin and having symmetrically attached to it the several connecting rods all of which are alike. In the second type connecting rods have been provided which, at their crank pin ends, are provided with feet or slippers which slide in one or more circular paths of travel provided by suitable grooves or channels formed in structure mounted to rotate with the crank pin.

The former type of construction, while providing the desired like motion of the several pistons, involves the use of additional parts and other undesirable mechanical complications in order to secure the desired result; while the latter type of construction, although avoiding undue complication, has in the forms of construction in which it has previously been composed, not proved to be of practical nature.

The general object of the present invention is to improve upon that form of connecting rod structure employing rods having slippers or feet, which hereinafter will conveniently be referred to as slipper rods, and to provide novel and improved slipper rod construction which is simple and rugged in its nature, which may readily be installed as a unitary structure, and which provides for adequate lubrication of the parts through the formation and maintenance of pressure oil films between the relatively sliding parts.

The manner in which this general object, and other and more detailed objects which will hereinafter appear may best be realized, together with the advantages to be derived from use of the invention, will best be understood from a consideration of the following portion of this specification descriptive of structures suitable for carrying the invention into effect.

In the accompanying drawings forming a part hereof:

Fig. 1 is a more or less diagrammatic end elevation of connecting rod structure embodying the invention in its application to a bank of seven radially arranged cylinders;

Fig. 2 is a section on enlarged scale taken on the line 2—2 of Fig. 1;

Fig. 3 is a section taken on the line 3—3 of Fig. 2;

Fig. 4 is an elevation of one of the rods shown in Fig. 1;

Fig. 5 is an elevation taken at right angles to the plane of Fig. 4;

Fig. 6 is a view taken on the line 6—6 of Fig. 2, certain portions being broken away for clearness.

Fig. 7 is a view similar to Fig. 2 showing a different mounting arrangement; and Figs. 8 and 9 are diagrams illustrative of certain characteristic features of structure embodying the invention.

Referring now more particularly to Figs. 1 to 6, reference numeral 10 indicates generally a crank shaft mounted to rotate about an axis X and having crank pin 12 carried by the crank webs 14 and 16.

In the construction illustrated, the crank pin is shown as being formed integrally with the web 14 and separable from the web 16 which is suitably bored and slotted to receive one end of the crank pin and is tightly clamped thereto as by means of a clamping bolt 18.

The rod structure comprises an annular mounting member indicated generally at 20 and adapted to be carried by the crank pin 12. This mounting member comprises a bushing 22 fitting the crank pin and suitably fixed against rotation thereon by any appropriate means such as splines or a key as shown at 24. Two retaining rings 26 and 28 are fixed to the ends of the bushing 22 and in the embodiment illustrated are advantageously fixed by means of threaded plugs 30 and 32, respectively, screwed into threaded sockets formed partially in the bushing and partially in the retaining rings respectively. Retaining rings 26 and 28 are flanged to provide cylindrical bearing surfaces 34 and 36 respectively which may conveniently be termed outer bearing surfaces, while the outer surface of the bushing 22 provides a cylindrical bearing surface 38 which may conveniently be termed the inner bearing surface of the mounting member. The outer bearing surfaces are advantageously of like diameter and as will be noted from Fig. 2 are radially spaced from the inner bearing surface 38. The outer bearing surfaces 34 and 36 are axially spaced from each other and at the axially inner ends of these surfaces the rings 26 and 28 are provided with flanges 40 and 42 respectively which project radially inwardly from the outer bearing surfaces.

All of the connecting rods 44 of the group included in the assembly are of like construction and as will be observed from Figs. 4 and 5, each is provided at one end with a suitable bore 46 for the reception of a piston pin 48. In so far as the present invention is concerned, the specific form of connection between the piston ends of the rods and the pistons indicated diagrammatically at 50 is immaterial and may be of any form suitable for the purpose. Intermediate its ends the blade portion 52 of the rod may be of any desired section, being of I-beam section in the embodiment illustrated. In the form of rod shown, the I-beam section adjacent to the crank pin end of the rod merges into a solid rectangular blade portion 54 at the lower end of which there is formed a curved foot or slipper 56 providing an inner arcuate bearing surface 58 and outer arcuate bearing surfaces 60 and 62. Between these latter surfaces and the blade portion 54 of the rod, grooves 64 and 66 respectively are provided. Advantageously, the ends of the slipper, considered in the plane of rotation, lie in radial planes passing through the axis of the crank pin, as indicated at 68 and 70.

The rods and mounting ring are assembled as follows:

The several rods are placed with their inner or slipper ends close enough together so that the inwardly projecting flanges 40 and 42 of the retaining rings can be slipped over the outer slipper surfaces 60 and 62 respectively. After the retaining rings are placed over the slippers, the rods are drawn outwardly in radial direction until the outer surfaces 60 and 62 are in contact respectively with the bearing surfaces 34 and 36. Thereafter the bushing 22 is inserted axially to its proper position and the rings locked thereto by means of the threaded plugs 30 and 32. The retaining rings 26 and 28 are preferably a tight fit on the bushing and in order to facilitate assembly and not score the bearing surface 38, the outer surface of the bushing is advantageously shouldered as at 38a and the internal diameter of the ring 28 made correspondingly larger than the internal diameter of the ring 26.

After assembly of the rod structure is effected, the mounting ring is then assembled and keyed on the crank pin, this of course being done before the crankshaft is assembled by clamping the removable web 16 to the end of the crank pin.

As will be observed from the drawings, the inner and outer concentric bearing surfaces of the mounting member provide a circular track in which the slipper portions of the rods may slide peripherally. Owing to the changes in angularity of the rods with respect to the rotating and reciprocating parts, it is necessary for the slipper ends of the rods to have a certain amount of rocking movement in the track in the plane of rotation, and in order to permit this rocking motion to be had, and further to permit all of the relatively sliding surfaces to be properly and adequately lubricated in all positions of the rods, the slipper ends thereof are formed in accordance with the present invention in a manner now to be described more particularly in conjunction with Figs. 8 and 9.

It is characteristic of the rods that while in some positions during the working cycle their axes are radially positioned with respect to the axis of the crank pin, they must move from this radial position to positions in which their axes are tangential with respect to a circle about the axis of the crank pin. As a result of this action, the peripheral extent of the slippers of all of the rods working in any one track must be less than 360° to provide the necessary peripheral spacing between adjacent slippers to permit the required peripheral shifting movement of the slipper ends of the rods as they move between limiting tangential positions. The maximum permissible peripheral extent of each slipper is determined as follows, referring particularly to the diagram of Fig. 8.

Referring to said diagram, let:

$n$ = number of rods
$R$ = crank radius
$L$ = length of connecting rod (crank pin center to piston pin center)
$r_1$ = radius (from center of crank pin to inner bearing surface contacted by slipper)
$P$ = maximum permissible width of slipper From the diagram of Fig. 8 the following equation may be derived:

$$L \sin\left(\frac{180}{n} - \gamma\right) = R \sin \frac{180}{n} \qquad (1)$$

By substituting the proper values of $n$, $R$, and $L$ for a given engine in the above equation, the value of $\gamma$ may be found, and the value of $P$ is then determined by substitution of the proper value of $\sin \gamma$ in the equation $$P = 2p = 2(r_1 \sin \gamma) \qquad (2)$$

In accordance with the present invention the inner and outer bearing faces of each slipper are arcuate in form and their distances radially from each other and the relation of their centers of curvature to each other and to the center of the bearing surfaces forming the track are such that as the rod rocks in either direction from a central radial position with respect to the crank pin toward a tangential position, such movement is limited by what may be said to constitute wedging of the slipper in the track between lines of contact between the inner and outer slipper faces and the respectively cooperating track surfaces.

Further, the relation of these surfaces to each other is made such that in the limiting positions determined by the wedging action and in all intermediate positions, wedge shaped spaces are formed which extend peripherally to each side of the lines of contact between the slipper faces and the track surfaces. In order to do this the relation between the surfaces must be such that in the limiting positions of the rod the lines of contact lie within the arc subtended by the slipper.

If this is accomplished a proper oil film wedge is provided on both sides of the lines of contact regardless of the direction of relative rotation between the surfaces.

To accomplish this end, certain principles must be followed of which the following are particularly to be noted.

In order to permit the required rocking movement to take place the maximum radial distance between the inner and outer slipper faces must be less than the radial extent of the track, to provide a small amount of radial clearance or play of the slipper in the track when the slipper is in radial position.

The arcuate slipper faces also are made eccentric with respect to each other and with respect to the center of the track. Further the outer slipper face has a smaller radius of curvature than the outer track surface, while the inner slipper face has a larger radius of curvature than the inner track surface. It is important that the centers of curvature of the slipper faces lie on the projection of the central longitudinal axis or center line of the rod.

In order more clearly to illustrate the nature of the form and relation to each other of surfaces embodying the principles of the invention, the diagram of Fig. 9 shows (in grossly exaggerated manner for the sake of clearness) the profile of a slipper and track embodying such principles.

In this figure the longitudinal central axis or center line of the rod is indicated by C. The radii of the inner and outer track surfaces are indicated by $r_1$ and $r_4$, respectively and the radii of the inner and outer slipper faces by $r_2$ and $r_3$, respectively.

As will be observed from the figure, the rod is illustrated in a limiting tangential position, further rocking of the slipper in the track due to movement of the piston end of the rod to the left of the figure being prevented by the wedging action between the lines of contact between the slipper faces and track surfaces, and indicated in the profile view by points A and B.

The radii $r_2$ and $r_3$ of the slipper faces should be selected to provide spaces $x$ and $y$ between the ends of the slipper faces and the respective track surfaces no larger than necessary, which in practice is advantageously of the order of two thousandths of an inch. Also, the radial clearance, which equals $r_4-r_1-t$, $t$ being the maximum thickness in a radial direction of the slipper, must have a reasonable value, advantageously of the order of two to three thousandths of an inch.

In the case where angle $\alpha$ equals angle $\beta$ (see Fig. 9), the calculation is much simplified. In that case $$r_4-r_3=r_2-r_1 \text{ (see triangle 1, 2, 3)} \quad (3)$$

Also;

$$t=2(r_2-r_1) \cos \alpha + r_3 - r_2 \quad (4)$$

This makes the clearance $c$ equal $$c=2(r_2-r_1)(1-\cos \alpha) \quad (5)$$

From the above it is possible to plot the clearance $c$ against $\alpha$ for various values of $(r_2-r_1)$.

The value of $x$ may be calculated by reference to the triangle 1, 2, 4, from which we have $$x=r_2-r_1 \cos \delta - (r_2-r_1) \cos \epsilon \quad (6)$$

$\epsilon$ is approximately equal to $(\gamma-\beta)$, or $(\gamma-\alpha)$.

$$\sin \delta = \frac{r_2-r_1}{r_1} \sin \epsilon \quad (7)$$

By substituting in Equation 6 the proper values for the cosines of the angles $\delta$ and $\epsilon$, the value of $x$ may be derived.

Similarly, $y$ may be derived and it will be found that for practical conditions the value of $y$ is always somewhat larger than $x$.

By way of specific example, if $(r_2-r_1)$ is equal to 0.160 inch, a clearance of 0.003 inch is obtained with $\alpha=7.2°$ and at that angle, $x=0.0025$ inch, both of these values being satisfactory.

If the above outlined general principles are followed, the limiting positions determined by the wedging of the slipper will in all cases be determined with lines of contact situated short of the ends of the slipper faces and due to the relation of the radii of curvature of the slipper faces to the radii of curvature of the track surfaces, wedge shaped oil film spaces will in all cases extend peripherally in both directions away from both lines of contact. This may clearly be seen from Fig. 9.

With wedge shaped spaces extending peripherally in this fashion it will readily be apparent that regardless of the direction of relative rotation of the parts, wedge shaped films of lubricant will be carried between the parts so that adequate lubrication of the surfaces subject to wear is insured under all operating conditions.

In the embodiment illustrated in Fig. 2 in which the mounting member is keyed to the crank pin, lubricant is advantageously supplied to the track under pressure through an oil duct 72 drilled in the crankshaft and crank pin from which one or more radially extending branch ducts 72a in the crank pin provide communication with holes 72b drilled through the bushing of the mounting member.

Lubricant supplied to the inner surface of the track by this means works outwardly under the influence of centrifugal force to lubricate the outer bearing surfaces of the track and in order to assist in insuring adequate lubrication of the outer surfaces, the inwardly projecting flanges 40—42 are provided on the retaining rings. It will be apparent that these inwardly projecting parts serve to maintain a layer of lubricant of appreciable depth on the outer bearing surfaces of the track on all portions thereof not in bearing contact with the slippers and this layer of lubricant provides a sufficient supply for the formation of the wedge shaped films at the zones of pressure contact between the parts.

In the embodiment just described, in which the mounting member is keyed to the crank pin, it will be apparent that the slippers will have sliding movement peripherally relative to the track as the crank pin revolves, in addition to the rocking movement resulting from the changes in angularity of the rods relative to the crank pin. This arrangement provides the greatest speed of sliding motion between the parts which is advantageous from the standpoint of carrying lubricant into the pressure zones between the sliding surfaces and building up pressure oil films between them.

On the other hand, in the case of very high speed engines it may be desirable to provide for relative sliding movement at a speed less than that which would be provided by the construction just described. In accordance with the principles of the present invention this is readily accomplished by utilizing what may be conveniently termed a floating mounting member. Such construction is illustrated in Fig. 7. In this embodiment the general construction of the mounting member and of the slippers is the same as previously described and detailed description thereof is accordingly not required. In the present instance, instead of keying or otherwise fixing the bushing to the crank pin, the bushing 22a is journaled on the crank pin and the web 16 of the crank shaft clamped to the pin in a position giving sufficient longitudinal clearance between the webs at the ends of the crank pin to permit the mounting member to rotate freely on the journal bearing provided by the pin.

When this form of construction is employed the lubrication may advantageously be effected by a central radial bore 72c for lubricating the crank pin journal bearing 74. Lubricant supplied to the journal bearing works longitudinally from the center toward each end of the bearing where it is collected in circular channels 76 and 78 at the ends of the bearing, these channels being conveniently formed by circular grooves at the ends of the bushing 22a, which communicate respectively with a series of oblique holes 80 and 82 drilled through the bushing to communicate with the inner bearing surface of the track. Grooves 76 and 78 are advantageously formed with lips 76a and 78a extending radially inwardly at the outer edges of the grooves so that the grooves will act as oil retaining channels from which the oil will be thrown to the track surface through the holes 80 and 82 rather than being thrown directly outwardly from the grooves between the ends of the mounting member and the faces of the crank webs. The action of the lubricant in the track will, of course, be the same in this embodiment as in the previously described embodiment in which the mounting member is fixed to the crank pin.

In the arrangement just described, the mounting member is free to rotate relative to the crank pin and also relative to the slippers and under different operating conditions may operate at different relative rotational speeds with respect to the crank pin and consequently with respect to the slippers. It will be evident that with any relative rotation between the crank pin and the mounting member, the speed of relative rotation between the mounting member and the slippers will be less than would be the case were the construction such as is illustrated in Fig. 2 and as previously noted, the construction of the present figure may in some instances advantageously be employed in order to avoid excessive speeds of sliding contact.

With the floating mounting member it is, of course, readily possible for substantially all of the relative rotary movement to take place between the mounting member and the crank pin journal, but even under this condition adequate lubrication of the slippers is insured because of the wedge shaped nature of the oil films that are formed, combined with the rocking action of the slippers which occurs in any event. Also, because of the large bearing area available between the crank pin and the mounting member as compared with the bearing area between the slippers and the track, the unit bearing pressure on the crank pin journal will be less than on the track surfaces and consequently higher relative rotational speeds can safely be employed when the high bearing speed is on the crank pin. It is further to be noted in connection with the matter of bearing speeds that the crank pin journal is necessarily of smaller diameter than the slipper track so that if, in the construction illustrated in Fig. 7, no appreciable relative rotation occurred between the slippers and the mounting member, the linear bearing speed of the crank pin journal would be less for any given crankshaft speed than would be the linear sliding bearing speed between the mounting member and the slippers in the construction shown in Fig. 2.

From the foregoing it will be evident that many changes in specific design may be made without departing from the principles of the invention, the scope of which is to be understood as in no wise limited by the forms of construction hereinbefore described by way of illustration, but which is to be considered as embracing all forms of structure falling within the scope of the appended claims when they are construed as broadly as is consistent with the state of the prior art.

What is claimed is:

1. Connecting rod structure for connecting a plurality of pistons to a common crank pin comprising a plurality of connecting rods each having a slipper at its crank pin and providing radially spaced inner and outer curved bearing faces and a mounting member adapted to be carried by the crank pin, said mounting member providing circular inner and outer bearing surfaces radially spaced from each other and coacting with the inner and outer bearing faces of said slippers to limit movement of the rods in radial direction with respect to the mounting member, the bearing surfaces of said member having curvature different from that of the respectively co-acting faces of said slipper to permit limited rocking movement of the rods with respect to said member in the plane of rotation of the crank pin.

2. A connecting rod structure for connecting a plurality of pistons to a common crank pin comprising an annular mounting member adapted to be carried by the crank pin and providing a circular track limited radially by spaced concentric inner and outer bearing surfaces and a plurality of connecting rods each having a slipper at its crank pin end, said slippers being located in said track and provided with curved inner and outer bearing faces located to move in sliding relation with respect to the inner and outer bearing surfaces of the track, the curvature of said bearing faces being sufficiently different from that of the respectively cooperating surfaces of said track to permit rocking movement of the slippers in said track while limiting the extent of said rocking movement by wedging contact between the surfaces of the track and the bearing faces of the slippers at places intermediate the ends of the slippers.

3. Connecting rod structure for connecting a plurality of pistons to a common crank pin comprising a mounting member providing a circular track having an inner circular bearing surface, an end wall, and an outer circular bearing surface concentric with said inner surface, and a plurality of connecting rods each having a slipper providing axially projecting curved inner and outer bearing faces situated in said track, said faces being curved and respectively having rates of curvature different from the rates of curvature of the bearing surfaces with which said faces respectively co-act to permit sliding and limited rocking movement of the slippers with respect to said track, means for supplying lubricant to the track and means projecting radially inwardly of said outer bearing surface for retaining lubricant thereon.

4. Connecting rod structure for connecting a plurality of pistons to a common crank pin comprising a mounting member providing a circular track having an inner circular bearing surface, an end wall, and an outer circular bearing surface concentric with said inner surface, and a plurality of connecting rods each having a slipper providing axially projecting curved inner and outer bearing faces situated in said track, said faces being curved and respectively having rates of curvature different from the rates of curvature of the bearing surfaces with which said faces respectively co-act to permit sliding and limited rocking movement of the slippers with respect to said track, and a lubricant retaining flange projecting radially inwardly from the end of said outer bearing surface opposite said end wall.

5. Connecting rod structure for connecting a plurality of pistons to a common crank pin comprising a mounting member providing a circular track having an inner bearing surface, walls at the opposite ends of said surface and axially spaced outer bearing surfaces concentric with said inner surface, and a plurality of connecting rods each having a slipper providing portions projecting axially from both sides of the blade of the rod, said slippers being situated in said track with the blade of the rods passing through the space between said outer bearing surfaces and the slippers being formed with curved inner and outer bearing faces having curvature different from that of the respectively co-acting bearing surfaces of said mounting member, whereby to permit sliding and limited rocking movement of the rods with respect to said mounting member.

6. Connecting rod structure for connecting a plurality of pistons to a common crank pin comprising a mounting member providing a circular track having an inner bearing surface, walls at the opposite ends of said surface and axially spaced outer bearing surfaces concentric with said inner surface, a plurality of connecting rods each having a slipper providing portions projecting axially from both sides of the blade of the rod, said slippers being situated in said track with the blades and the rods passing through the space between said outer bearing surfaces and the slippers being formed with curved inner and outer bearing faces, the rates of curvature of said faces being different, respectively, from the rates of curvature of the bearing surfaces with which said faces respectively co-act to permit sliding and limited rocking movement of the rods with respect to said mounting member, means for supplying lubricant to said track, and means projecting radially inwardly from the adjacent ends of said spaced outer bearing surfaces for retaining lubricant thereon.

7. In combination a crank pin, an annular connecting rod mounting member rotationally fixed on said crank pin, said mounting member providing a circular track having concentric inner and outer bearing surfaces and a circumferential slot through the outer wall of said member, and a plurality of connecting rods each having a blade and an arcuate slipper projecting axially from the blade, said slippers being situated in said track and having curved inner and outer bearing faces co-acting with the surfaces of the track, said bearing faces having curvature different from the respectively co-acting surfaces of the track to permit sliding and limited rocking movement of the rods relative to said mounting member and the blades of said rods passing through said slot.

8. In combination, a crank pin, an annular connecting rod mounting member rotationally fixed on said pin, said member comprising a bushing part providing a bearing surface, a plurality of connecting rods having slippers provided with curved surfaces arranged to slide on said bearing surface, said curved surfaces having a smaller rate of curvature than that of said bearing surface, whereby to provide wedge shaped spaces opening away from the place of contact between each slipper and said bearing surface, retaining rings fixed to said bushing part and engaging the radially outer surface of said slippers, and means for supplying lubricant to the relatively sliding surfaces.

9. In combination a crank pin, an annular connecting rod mounting member rotationally fixed on said pin, said member comprising a bushing part providing a bearing surface, a plurality of connecting rods having arcuate slippers having radially inner surfaces arranged to slide on said bearing surface, retaining rings fixed to said bushing part and engaging in sliding relation the radially outer surfaces of said slippers, the co-acting sliding surfaces having different rates of curvature to provide wedge-shaped spaces therebetween opening away from the places of contact between the surfaces, and a passage for supplying lubricant through the crank pin and said mounting member to the bearing surface provided by said bushing.

10. In a connecting rod construction, a mounting member providing a circular track having radially spaced concentric inner and outer bearing surfaces and a connecting rod having a curved slipper situated in said track, said slipper having curved inner and outer bearing faces adapted to co-act respectively with the inner and outer bearing surfaces of said track, and the bearing faces of said slipper being eccentric with respect to each other and eccentric with respect to the bearing surfaces of said mounting member.

11. In a connecting rod construction, a mounting member providing a circular track having radially spaced concentric inner and outer bearing surfaces, and a connecting rod having a curved slipper situated in said track, said slipper having arcuate inner and outer bearing faces adapted to co-act respectively with the inner and outer bearing surfaces of said track, said bearing faces being eccentric with respect to each other and eccentric with respect to the bearing surfaces of said mounting member.

12. In a connecting rod construction, a mounting member providing a circular track having radially spaced concentric inner and outer bearing surfaces, and a connecting rod having a curved slipper situated in said track, said slipper having arcuate inner and outer bearing faces adapted to co-act respectively with the inner and outer bearing surfaces of said track, the outer bearing face of the slipper having a smaller radius than the outer bearing surface of the track, the inner bearing face of the slipper having a larger radius than the radius of the inner bearing surface of the track and the radii of the bearing faces of the slipper having different centers.

13. In a connecting rod construction, a mounting member providing a circular track having radially spaced concentric inner and outer bearing surfaces, and a connecting rod having a curved slipper situated in said track, said slipper having arcuate inner and outer bearing faces adapted to co-act respectively with the inner and outer bearing surfaces of said track, the maximum radial distance between the inner and outer bearing faces of the slipper being less than the radial distance between the bearing surfaces of the mounting member to provide for radial clearance between the slipper and the walls of the track when the rod is in radial position and the radii of the bearing faces on the slipper being proportioned and the centers thereof located with relation to said clearance so that when the rod is moved from radial position toward a tangential position with respect to said track, the bearing faces of the slipper make wedging contact with the bearing surfaces of the track along lines peripherally spaced from the ends of the slipper faces.

14. A slipper type connecting rod having a blade and an arcuate slipper extending transversely across one end of the blade, said slipper comprising spaced inner and outer arcuate bearing faces, the centers of the radii of the arcs of said faces lying on the inwardly extending projection of the central longitudinal axis of the rod, the center of the arc of the inner bearing face being at a greater distance from the slipper on said projected axis than the center of the arc of the outer bearing face.

15. A slipper type connecting rod having a blade and an arcuate slipper extending transversely across one end of the blade, said slipper comprising spaced inner and outer arcuate bearing faces, the centers of the radii of the arcs of said faces lying on the inwardly extending projection of the central longitudinal axis of the rod, the center of the arc of the inner bearing face being at a greater distance from the slipper on said projected axis than the center of the arc of the outer bearing face, and the difference between the lengths of said radii being less than the distance between their respective centers on the projection of said axis.

16. In a connecting rod construction, a mounting member providing a circular track having radially spaced concentric inner and outer bearing surfaces and a connecting rod having a curved slipper situated in said track, said slipper having curved inner and outer bearing faces eccentric with respect to each other and with respect to the bearing surfaces of said track, the degree of curvature of both bearing faces of the slipper being proportioned relative to the radii of the bearing surfaces of the track to provide peripherally extending wedge-shaped spaces at either side of the lines of contact between the bearing faces of the slipper and the mutually cooperating bearing surfaces of the track, the maximum radial distance between said bearing faces being less than the radial difference between the bearing surfaces of the track, whereby to permit rocking movement of the slipper in the track, and the eccentricity of the surfaces with respect to each other providing limiting positions of said rocking movement in which the lines of contact between the respectively cooperating faces and surfaces are located substantially within the arc subtended by the slipper.

17. In a connecting rod construction, a mounting member providing a circular track having radially spaced concentric inner and outer bearing surfaces and a connecting rod having an arcuate slipper situated in said track, said slipper having arcuate inner and outer bearing faces eccentric with respect to each other and with respect to the bearing surfaces of said track, the radii of curvature of both bearing faces of the slipper being proportioned relative to the radii of the bearing surfaces of the track to provide peripherally extending wedge shaped spaces at either side of the lines of contact between the bearing faces of the slipper and the mutually cooperating bearing surfaces of the track, the maximum radial distance between said bearing faces being less than the radial distance between the bearing surfaces of said track, whereby to permit rocking movement of the slipper in the track, and the eccentricity of said surfaces with respect to each other providing limiting positions of said rocking movement in which the lines of contact between the respectively cooperating faces and surfaces are located substantially within the arc subtended by the slipper.

18. A connecting rod construction comprising a mounting member providing a circular track having radially spaced concentric inner and outer bearing surfaces and a connecting rod having an arcuate slipper situated in said track, said slipper having limited rocking movement in said track and having arcuate radially spaced inner and outer bearing faces each eccentric with respect to the bearing surface with which it cooperates, whereby to peripherally shift the lines of contact between the respectively cooperating surfaces as the slipper rocks in the track, and the radii of curvature of the inner and outer bearing faces being related to the radii of curvature of the cooperating bearing surfaces of the mounting member to provide limiting positions of such rocking movement in which said lines of contact lie within the arc subtended by the slipper.

19. In a connecting rod construction, a mounting member providing a circular track having concentric radially spaced inner and outer bearing surfaces and a connecting rod having an arcuate slipper situated in said track and having arcuate inner and outer bearing faces, the maximum radial distance between the bearing faces of the slipper being less than the radial distance between the bearing surfaces of said track, the center of the arc of the inner bearing face of the slipper being located on the inwardly extending projection of the central axis of the connecting rod on the side of the center of said circular track remote from the slipper, and the center of the arc of the outer bearing face of the slipper being located on the projection of said axis between the slipper and the center of said track.

20. In a connecting rod construction, a mounting member providing a circular track having concentric radially spaced inner and outer bearing surfaces and a connecting rod having an arcuate slipper situated in said track, said slipper having arcuate inner and outer bearing faces of the arcs of which are located about different centers on the inwardly extending projection of the longitudinal axis of the rod and the radii of said arcs being proportioned so that in all positions of the slipper within said track, wedge shaped spaces are provided opening peripherally in both directions away from the lines of contact between the bearing faces and the respectively co-acting surfaces of the mounting member.

21. In a connecting rod construction, a mounting member providing a circular track having concentric radially spaced inner and outer bearing surfaces and a connecting rod having an arcuate slipper situated in said track, said slipper having inner and outer bearing faces curved differently from their respective coacting bearing surfaces to permit limited rocking movement in said track, and said coacting faces and bearing surfaces providing wedge shaped spaces opening peripherally in both directions from the lines of contact between the bearing faces and the bearing surfaces of the track in all positions of the slipper within the range of said limited rocking movement.

22. In a connecting rod construction, a mounting member providing a circular track having concentric radially spaced inner and outer bearing surfaces and a connecting rod having a curved slipper situated in said track, said slipper having inner and outer bearing faces of different curvature than the curvature of the respectively cooperating bearing surfaces of said track to permit limited rocking movement of the rod relative to the mounting member, and to provide wedge-shaped spaces opening peripherally in both directions from the lines of contact between the bearing faces and the bearing surfaces of the track in all positions of the slipper within the range of said limited rocking movement.

23. In a connecting rod construction, structure providing a circular track having radially spaced concentric inner and outer bearing surfaces and a connecting rod having a curved slipper situated in said track, said slipper having inner and outer bearing faces the curvature of which is different from that of the respectively co-acting bearing surfaces of the track to permit limited rocking movement of the slipper in said track in the plane of the track and to provide substantially line contact normal to said plane between each slipper face and its co-acting track surface.

24. In a connecting rod construction, structure providing a circular track having radially spaced concentric inner and outer bearing surfaces and a connecting rod having a curved slipper situated in said track, said slipper having inner and outer bearing faces adapted to co-act respectively with the inner and outer bearing surfaces of said track, the rate of curvature of the outer face of the slipper being greater than that of the outer bearing surface of the track and the rate of curvature of the inner face of the slipper being less than that of the inner bearing surface of the track, whereby to provide for limited rocking movement of the slipper in said track in the plane of the track and to provide substantially line contact normal to said plane between each slipper face and its co-acting track surface with the line of contact between the inner surfaces and the line of contact between the outer surfaces lying on opposite sides of a radial line extending from the axis of the track through the center of the slipper, whenever the slipper is in a rocked position in the track.

ANDRÉ J. MEYER.
ROSS E. TAYLOR.